United States Patent
Okamura et al.

(10) Patent No.: US 9,037,332 B2
(45) Date of Patent: May 19, 2015

(54) VEHICLE HAVING OBSTACLE DETECTION DEVICE

(75) Inventors: Ryuji Okamura, Toyota (JP); Yuka Sobue, Nagoya (JP); Chika Yoshioka, Toyota (JP); Yu Hiei, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/001,889

(22) PCT Filed: Mar. 17, 2011

(86) PCT No.: PCT/JP2011/056422
§ 371 (c)(1),
(2), (4) Date: Aug. 28, 2013

(87) PCT Pub. No.: WO2012/124107
PCT Pub. Date: Sep. 20, 2012

(65) Prior Publication Data
US 2014/0005870 A1  Jan. 2, 2014

(51) Int. Cl.
| | |
|---|---|
| *G08G 1/16* | (2006.01) |
| *B60L 3/00* | (2006.01) |
| *B60R 21/00* | (2006.01) |
| *B60W 20/00* | (2006.01) |
| *B60L 11/18* | (2006.01) |
| *B60L 15/20* | (2006.01) |
| *B60R 21/01* | (2006.01) |
| *B60L 7/14* | (2006.01) |
| *B60L 11/12* | (2006.01) |
| *B60L 11/14* | (2006.01) |

(52) U.S. Cl.
CPC ............... *B60W 20/00* (2013.01); *B60L 3/003* (2013.01); *B60L 11/1803* (2013.01); *B60L 15/20* (2013.01); *B60L 2270/142* (2013.01); *B60R 21/01* (2013.01); *Y02T 10/7005* (2013.01); *Y02T 10/644* (2013.01); *Y02T 10/70* (2013.01); *Y02T 10/648* (2013.01); *Y10S 903/903* (2013.01); *B60L 7/14* (2013.01); *B60L 11/123* (2013.01); *B60L 11/14* (2013.01); *B60L 2210/40* (2013.01); *Y02T 10/7077* (2013.01); *Y02T 10/7241* (2013.01); *Y02T 10/6217* (2013.01)

(58) Field of Classification Search
CPC ... B60L 3/003; B60L 11/1803; B60L 11/123; B60L 11/14; B60L 15/20; B60L 21/01; B60L 7/17; B60L 2270/142; B60L 2210/40; B60W 20/00; Y02T 10/7005; Y02T 10/644; Y02T 10/70; Y02T 10/648; Y02T 10/7077; Y02T 10/7241; Y02T 10/6217; Y10S 903/903; Y10S 367/901; G01S 15/931
See application file for complete search history.

(56) References Cited

U.S. PATENT DOCUMENTS

| | | | | |
|---|---|---|---|---|
| 5,689,250 | A  * | 11/1997 | Kremser | 340/904 |
| 7,652,443 | B2 * | 1/2010 | Schulz et al. | 318/432 |
| 2009/0115362 | A1* | 5/2009 | Saha et al. | 318/400.09 |

FOREIGN PATENT DOCUMENTS

| | | |
|---|---|---|
| JP | 2000-184505 | 6/2000 |
| JP | 2004-48844 | 2/2004 |

(Continued)

*Primary Examiner* — Michael J Zanelli
(74) *Attorney, Agent, or Firm* — Finnegan, Henderson, Farabow, Garrett & Dunner, LLP

(57) ABSTRACT

The invention provides a vehicle having an obstacle detection device capable of improving the control accuracy of a motor and preventing the influence of noise on a sensor. A vehicle includes motors 31 and 32 which are AC motors, an inverter 2 that drives the motors, an ultrasonic sonar 1 which is, for example, a detector for detecting an obstacle around the vehicle, a frequency determining device 6 which determines whether noise generated from the inverter 2 is likely to interfere with a detection frequency of the detector, and a sonar ECU 5 which changes the carrier frequency of the inverter 2 when it is determined that the noise is likely to interfere with the detection frequency.

4 Claims, 8 Drawing Sheets

(56) References Cited

FOREIGN PATENT DOCUMENTS

| | | |
|---|---|---|
| JP | 2004-170183 | 6/2004 |
| JP | 2005-166171 | 6/2005 |
| JP | 2009-100548 | 5/2009 |
| JP | 2009-291019 | 12/2009 |
| JP | 2010-132141 | 6/2010 |
| JP | 2010-230427 | 10/2010 |
| WO | WO 2009/060543 | 5/2009 |

* cited by examiner

VEHICLE HAVING OBSTACLE DETECTION DEVICE

TECHNICAL FIELD

The present invention relates to a vehicle having an obstacle detection device capable of detecting obstacles around a vehicle, and more particularly, to a vehicle including an AC motor which is driven by an inverter.

BACKGROUND ART

A technique has been known which detects obstacles around the vehicle using an object sensor such as an ultrasonic sensor (sonar) or a laser radar provided in the vehicle. Patent Literature 1 discloses an obstacle detection device using an ultrasonic sensor. An object of the technique is to prevent the occurrence of an error due to the interference between noise and signals transmitted or received by the sensor. In the technique, a sensor which can change a transmission frequency is used and the transmission frequency and reception sensitivity of the sensor when noise is detected are different from those in a normal state. In this way, an operation error due to noise and a change in a detection area are prevented.

CITATION LIST

Patent Literature

[Patent Literature 1] JP2010-230427A

SUMMARY OF INVENTION

Technical Problem

In recent years, there is an increasing demand for a vehicle having a motor as a driving source, such as a hybrid vehicle or an electric vehicle. An AC motor is used as this type of motor and the frequency of an inverter for driving the motor is controlled to control the operation of the motor. There is a strong tendency to increase the carrier frequency of the inverter to 20 kHz or more, in order to improve the control accuracy of the motor and response or fuel efficiency. In the ultrasonic sensor, it is necessary to reduce the detection frequency (for example, to 40 kHz or less) in order to widen the sensor area (increase the length thereof). As a result, noise generated from the inverter is likely to affect the sensor.

It is an object of the invention to provide a vehicle having an obstacle detection device capable of improving the control accuracy of a motor and preventing the influence of noise on a sensor.

Solution to Problem

In order to achieve above mentioned object, a vehicle having an obstacle detection device according to the invention includes an AC motor, an inverter that drives the motor, a detector that detects an obstacle around a vehicle using an electromagnetic wave or a sound wave, determining means for determining whether noise generated from the inverter is likely to interfere with a detection frequency of the detector, and control means for changing a carrier frequency of the inverter when the determining means determines that the noise is likely to interfere with the detection frequency.

The control means may intermittently operate the detector and change the carrier frequency of the inverter only when the detector is operated. The detector is, for example, an ultrasonic sonar.

The motor may perform regenerative braking when the vehicle is braked, and the control means may prohibit the regenerative braking and permit only hydraulic braking when the detector detects the obstacle.

Advantageous Effects of Invention

According to the invention, it is determined whether noise generated from the inverter is likely to interfere with the detection frequency of the detector and the carrier frequency of the inverter is changed when it is determined that the noise is likely to interfere with the detection frequency. Therefore, it is possible to prevent the interference of noise generated from the inverter with the detection frequency of the detector. In this way, it is possible to improve the control accuracy of the motor and prevent the influence of noise.

The detector is intermittently operated and the carrier frequency of the inverter is changed without interference only when the detector is operated. Therefore, when the detector is not operated, it is possible to improve the control accuracy of the motor. As a result, it is possible to further improve the two effects.

When the detector is an ultrasonic sonar, the frequency of the ultrasonic sonar can be reduced and the carrier frequency of the inverter can be increased. Therefore, it is possible to improve the control accuracy of the motor and prevent the influence of noise.

When the obstacle is detected, regenerative braking is prohibited even though the regenerative braking is available. An operation of detecting obstacles using the detector takes priority over an operation of controlling regenerative braking with high accuracy. Therefore, it is possible to detect obstacles with high accuracy and further improve the safety of the vehicle.

DESCRIPTION OF EMBODIMENTS

Figure 1:
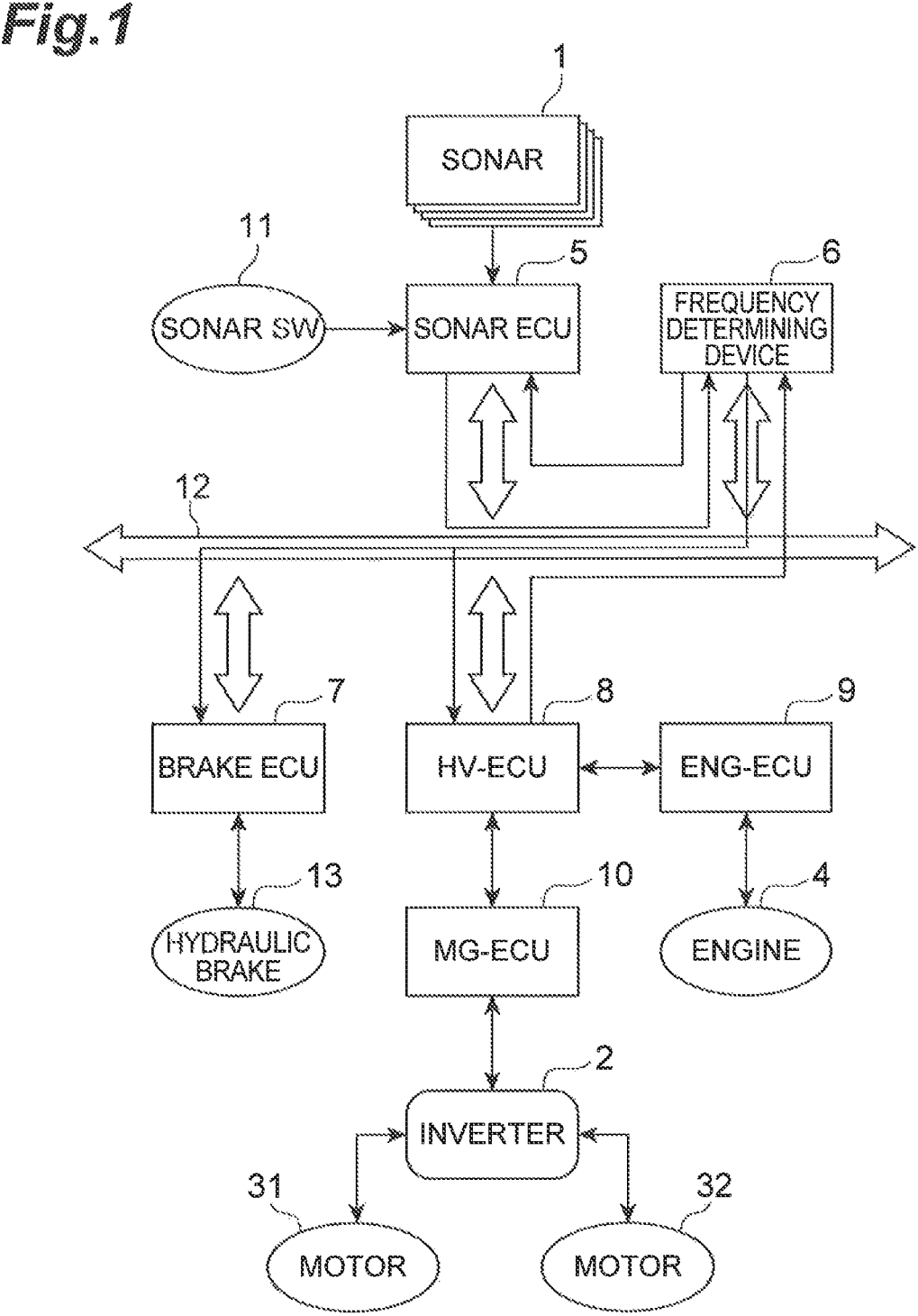
FIG. 1 is a block diagram illustrating devices provided in a vehicle having an obstacle detection device according to the invention.

Hereinafter, an exemplary embodiment of the invention will be described in detail with reference to the accompanying drawings. For ease of understanding, in the drawings, the same components are denoted by the reference numerals if possible and the description thereof will not be repeated.

Figure 2:
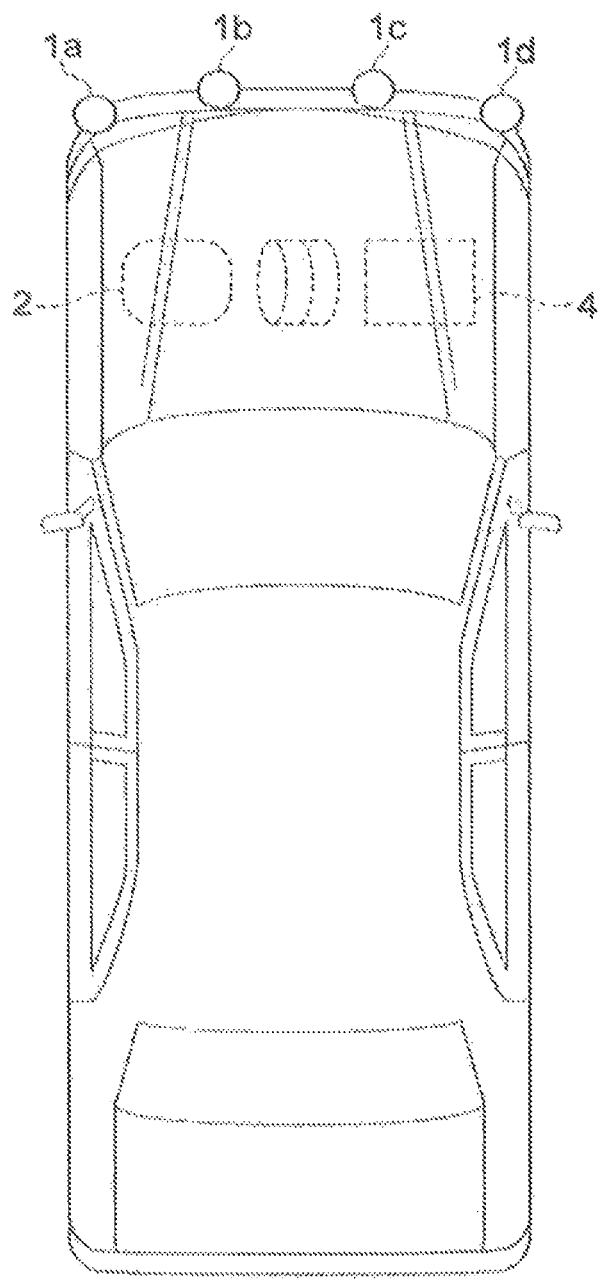
FIG. 2 is a diagram illustrating the arrangement relationship between a sonar and an inverter in the vehicle shown in FIG. 1.

FIG. 1 is a block diagram illustrating devices provided in a vehicle having an obstacle detection device according to the invention and FIG. 2 shows the arrangement relationship between a sonar and an inverter in the vehicle. The obstacle detection device according to this embodiment includes an ultrasonic sonar 1 which is an object sensor serving as a detector, a sonar switch (SW) 11 which turns on or off the detection of an obstacle by the sonar, and a sonar ECU (Electrical Control Unit) 5 which is a control unit.

This vehicle is a so-called split hybrid, vehicle. The vehicle includes, as a driving source, an engine 4 which is an internal-combustion engine, a motor 31 which functions as an electric generator, and a motor 32 which functions as an output motor. The engine 4, the motor 31, and the motor 32 are connected to a power division mechanism (not shown). A planetary gear may be used as the power division mechanism. Each of the motors 31 and 32 is an AC motor and is driven by an inverter 2.

The motor 31 generates electric power when the vehicle is decelerated or braked and performs regenerative braking which converts the kinetic energy of the vehicle into electric energy and decelerates the vehicle. In addition, the vehicle includes a hydraulic brake 13 as a braking device. A vehicle control system includes a brake ECU 7 which controls the hydraulic brake 13, an ENG (Engine)-ECU 9 which controls the engine 4, an MG (Motor Generator)-ECU 10 which is control means for controlling the inverter 2, and an RV (Hybrid Vehicle)-ECU 8 which controls the ENG-ECU 9 and the MG-ECU 10, in addition to the sonar ECU 5. Each ECU includes, for example, a CPU, a ROM, and a RAM. Some or all of the hardware components of the ECUs may be shared. The ECUs are connected to a CAN (Controller Area Network) 12 which is an in-vehicle LAN. In addition, a frequency determining device 6, which is determining means for determining the likelihood of interference between the inverter 2 and the sonar 1, is connected to the CAN 12.

For example, as shown in FIG. 2, sonars 1a to 1d are arranged at the leading end of the vehicle with a gap therebetween. The inverter 2, the motors 31 and 32, and the engine 4 are arranged in a bonnet which is provided in the front part of the vehicle. The detection frequency of the sonars 1a to 1d is set in the range of 20 kHz to 40 kHz. As the frequency of ultrasonic waves increases, the coverage thereof is reduced. Therefore, the frequency is reduced to increase a detection range. In some cases, the carrier frequency of the inverter 2 increases to 20 kHz or more in order to improve the control accuracy of the motors 31 and 32. Therefore, the noise of the inverter 2 is likely to affect the sonars 1a to 1d which are arranged in the vicinity of the inverter 2.

Figure 3:
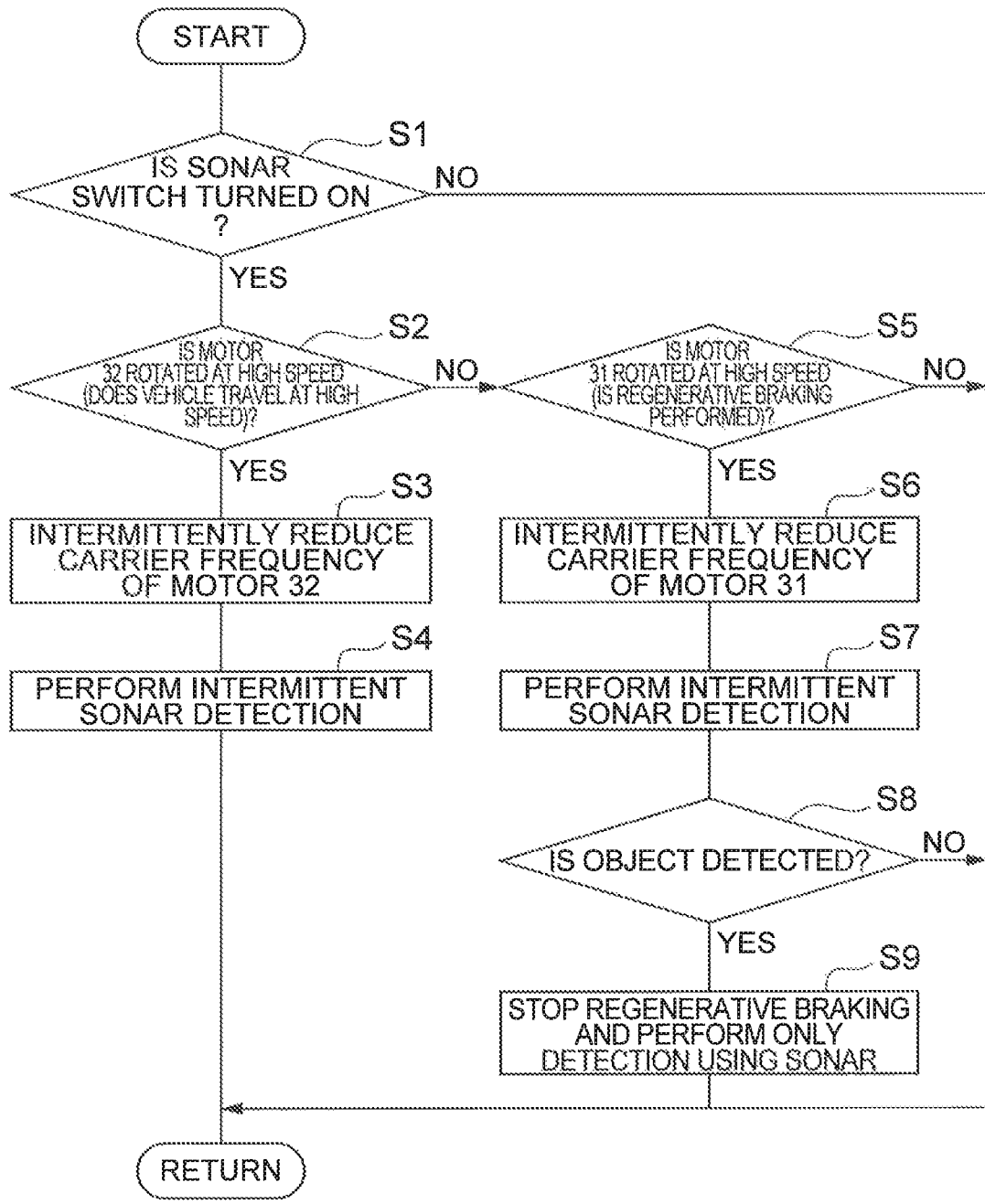
FIG. 3 is a flowchart illustrating a control process of the devices shown in FIG. 1.

In this embodiment, a control process for preventing the influence of the noise is performed. FIG. 3 is a flowchart illustrating the control process. The frequency determining device 6 mainly performs the control process in cooperation with other ECUs.

First, it is determined whether the sonar SW 11 is turned on (Step S1). When the sonar SW 11 is not turned on, the subsequent processes are skipped and the control process ends since the inverter 2 does not interfere with the sonar 1. On the other hand, when the sonar SW 11 is turned on, the process proceeds to Step S2 since the inverter 2 is likely to interfere with the sonar 1.

Figure 4:
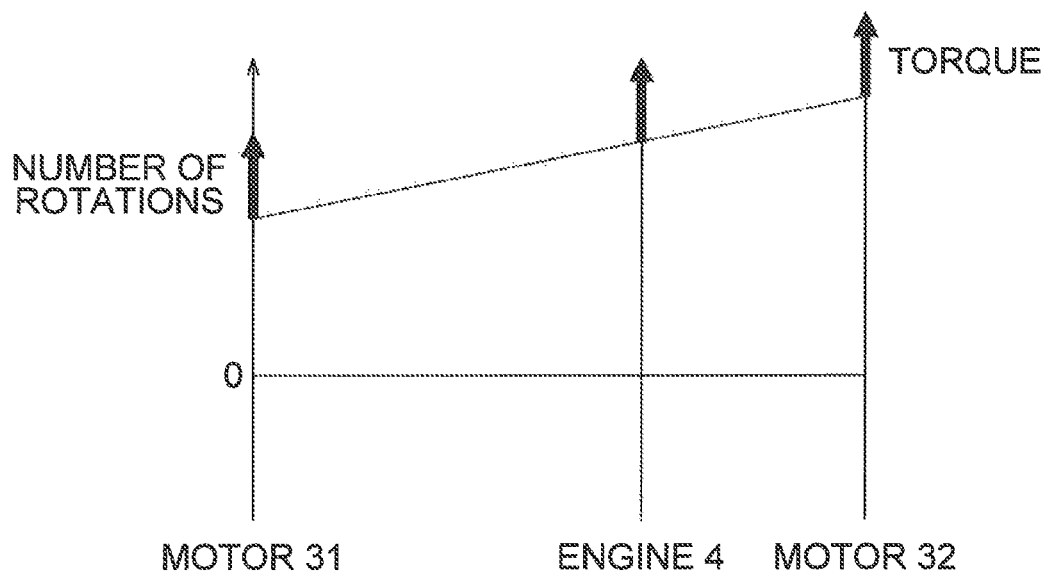
FIG. 4 is a system collinear diagram when the vehicle travels at a high speed.

Then, in Step S2, first, it is determined whether the motor 32 is rotated at a high speed, that is, the vehicle travels at a high speed. When the vehicle travels at a high speed, the process proceeds to Step S3. FIG. 4 shows a system collinear diagram in this case. Both the motor 32 and the engine 4 are driven to increase driving output. At the same time, the motor 31, which is an electric generator, is driven to collect extra energy. In this case, the carrier frequency of the inverter 2 for driving the motor 32 is likely to increase with an increase in the rotational speed of the motor 32. Then, the frequency determining device 6 instructs the MG-ECU 10 to change the carrier frequency of the inverter 2 for driving the motor 32 through the HV-ECU 8, thereby intermittently reducing the frequency (Step S3). In addition, the frequency determining device 6 instructs the sonar ECU 5 to perform intermittent sonar detection for intermittently detecting an obstacle using the sonars 1a to 1d when the carrier frequency is reduced (Step S4).

Figure 5:
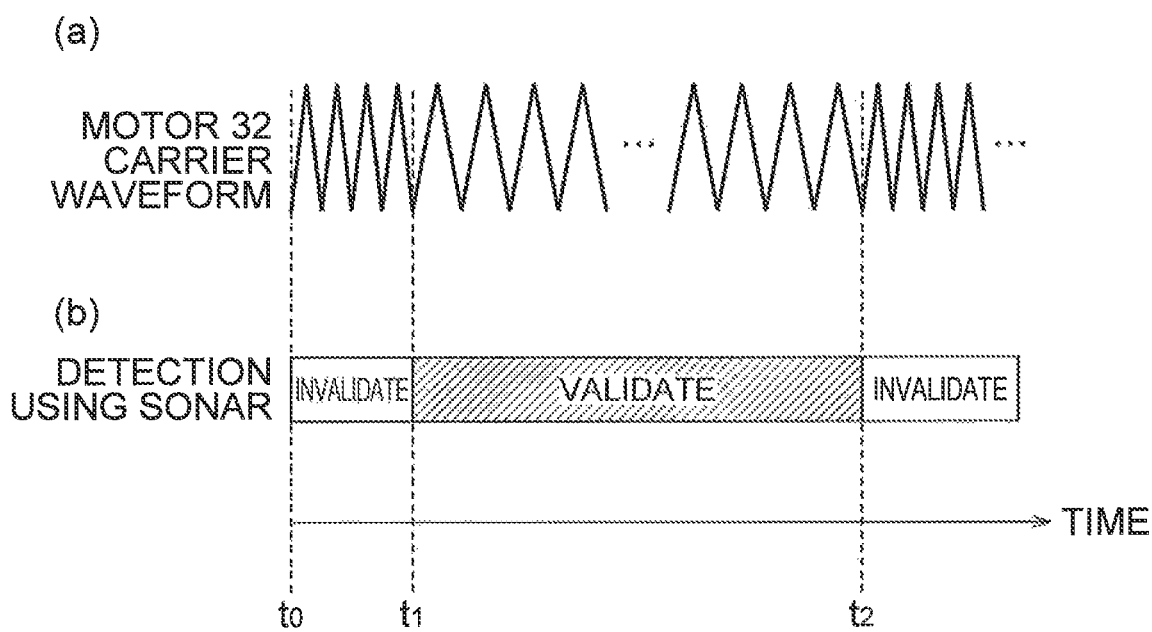
FIG. 5 is a timing chart illustrating inverter carrier control and sonar detection when the vehicle travels at a high speed.

FIG. 5 shows an example of a timing chart in this case. For example, detection using the sonars 1a to 1d is invalidated for the period between times $t_0$ and $t_1$ and the period after a time $t_2$ for which the carrier frequency of the inverter 2 for driving the motor 32 is high. On the other hand, the detection using the sonars 1a to 1d is validated for the period between the times $t_1$ and $t_2$ for which the carrier frequency of the inverter 2 for driving the motor 32 is low. As such, detection using the sonar is performed when the carrier frequency of the inverter 2 is low. Therefore, it is possible to perform detection using the sonar when the influence of the noise of the inverter 2 is reduced and thus perform measurement with high accuracy. In addition, since the carrier frequency of the inverter 2 can be intermittently increased, the control accuracy of the motor 32, which is an electric motor, is improved and response or fuel efficiency is improved.

When it is determined in Step S2 that the vehicle does not travel at a high speed, the process proceeds to Step S5 and it is determined whether the motor 31 is rotated at a high speed, that is, the motor 31 is in a regenerative braking state. When the motor 31 is not rotated at a high speed, it is determined that all of the motors are not rotated at a high speed, the carrier frequency is low, and there is no likelihood of interference with the sonar. The subsequent process is skipped and the control process ends.

Figure 6:
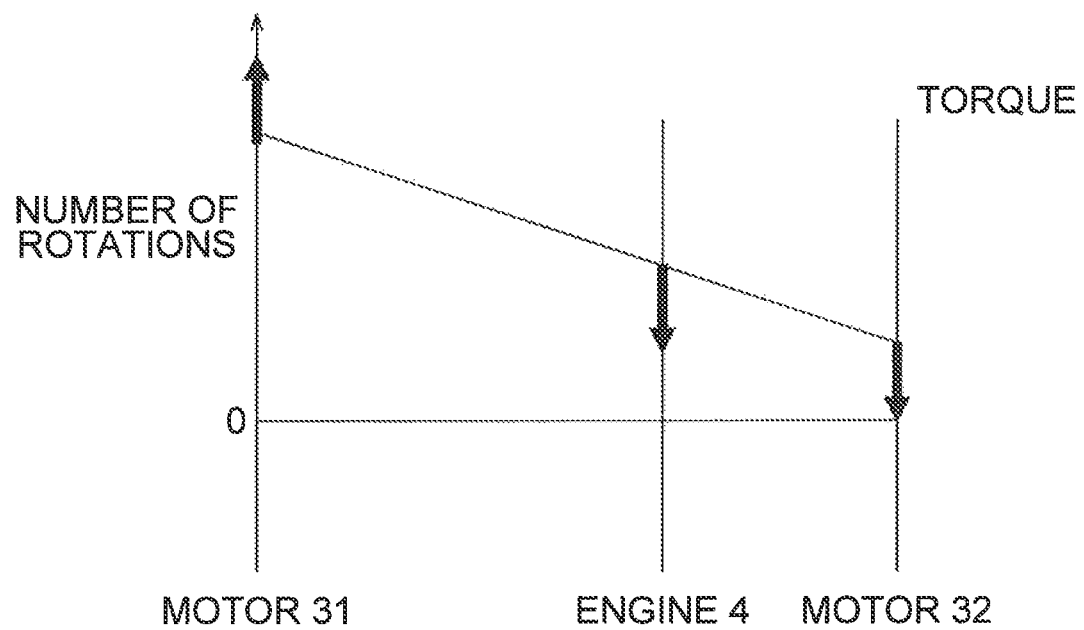
FIG. 6 is a system collinear diagram during regenerative braking.

On the other hand, when it is determined that the motor 31 is in the regenerative braking state, the process proceeds to Step S6. FIG. 6 shows a system collinear diagram in this case. Since the motor 31 is in the braking state, the number of rotations of both the motor 32 and the engine 4 is reduced. The motor 31, which is an electric generator, is rotated at a high speed, running energy is converted into electric energy, thereby energy is collected, and the vehicle is decelerated. In this case, the carrier frequency of the inverter 2 for driving the motor 31 is likely to increase with an increase in the rotation speed of the motor 31. Then, the frequency determining device 6 instructs the MG-ECU 10 to intermittently reduce the carrier frequency of the inverter 2 for driving the motor 31 through the HV-ECU 8 (Step S6). In addition, the frequency determining device 6 instructs the sonar ECU 5 to perform intermittent sonar detection for intermittently detecting an obstacle using the sonars 1a to 1d when the carrier frequency is reduced (Step S7).

Figure 7:
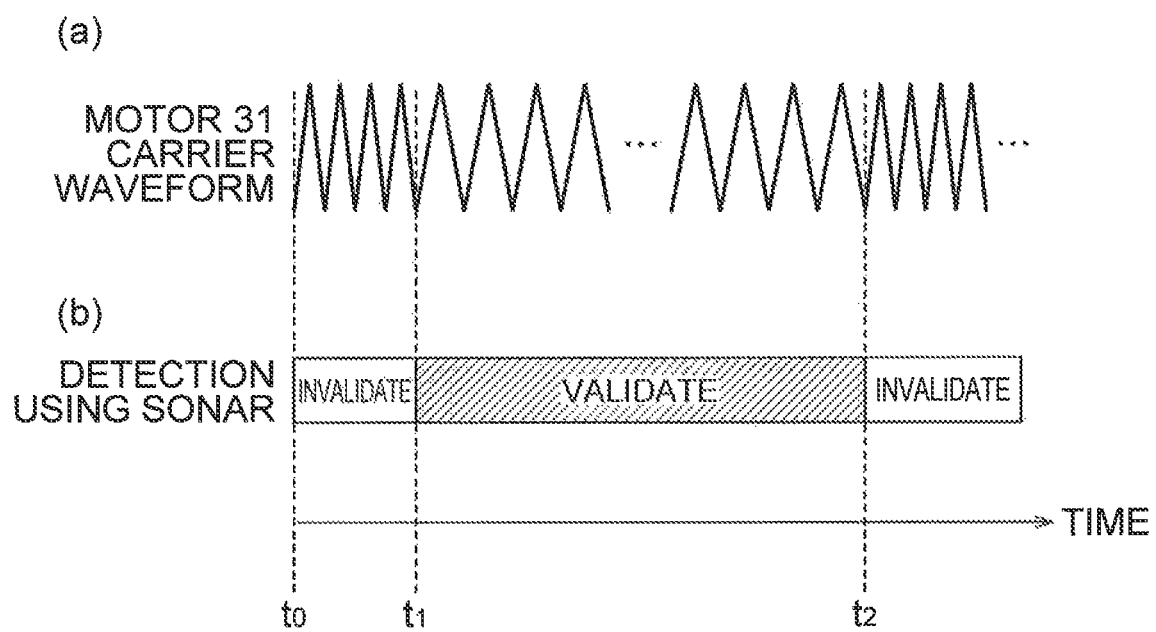
FIG. 7 is a timing chart illustrating inverter collier control and sonar detection in a normal state during regenerative braking.

FIG. 7 shows an example of a timing chart in this case. For example, detection using the sonars 1a to 1d is invalidated for the period between times $t_0$ and $t_1$ and the period after a time $t_2$ for which the carrier frequency of the inverter 2 for driving the motor 31 is high. On the other hand, the detection using the sonars 1a to 1d is validated for the period between the times $t_1$ and $t_2$ for which the carrier frequency of the inverter 2 for driving the motor 31 is low. As such, detection using the sonar is performed when the carrier frequency of the inverter 2 is low. Therefore, similarly to Steps S3 and S4, it is possible to perform detection using the sonar when the influence of the noise of the inverter 2 is reduced and thus perform measurement with high accuracy. In addition, since the carrier frequency of the inverter 2 can be intermittently increased, the control accuracy of the motor 32, which is an electric motor, is improved and response or fuel efficiency is improved.

Then, it is determined whether an obstacle is detected by intermittent sonar detection during regenerative braking (Step S8). When no obstacle is detected, the process ends. In this case, Steps S6 and S7 are repeatedly performed during regenerative braking until an obstacle is detected. On the other hand, when an obstacle is detected, the process proceeds to Step S9, regenerative braking is prohibited, only hydraulic braking using the hydraulic brake 13 is permitted, and detection using the sonar is performed.

Figure 8:
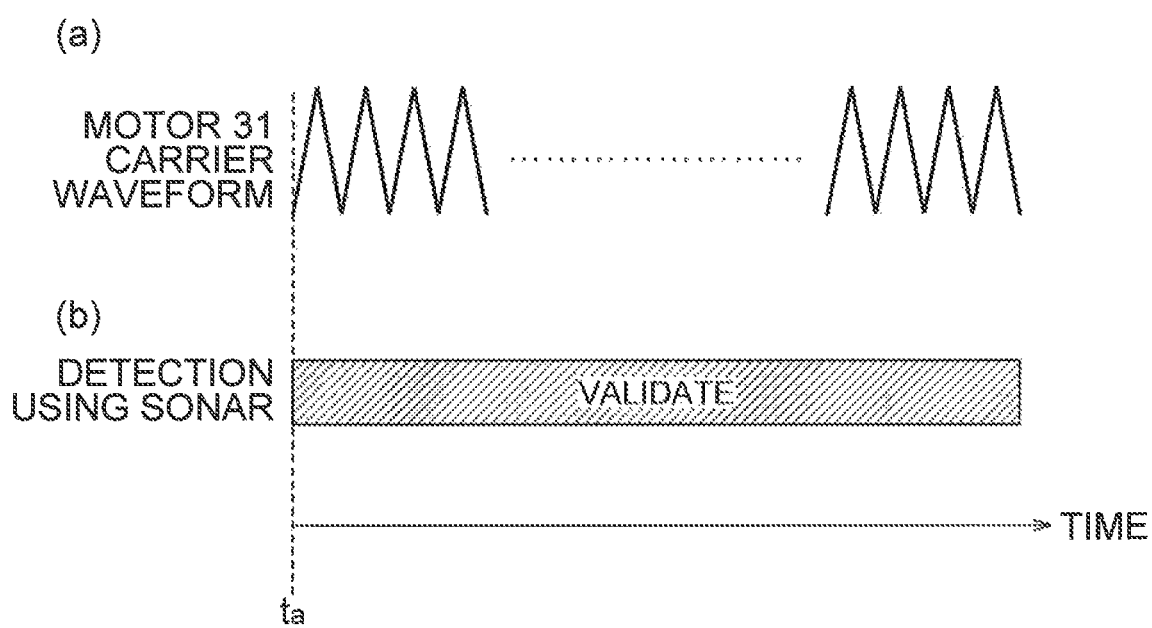
FIG. 8 is a timing chart illustrating inverter carrier control and sonar detection when an obstacle is detected during regenerative braking.

FIG. 8 shows an example of a timing chart in this case. As shown in FIG. 8(*a*), the carrier frequency of the inverter 2 for driving the motor 31 is maintained at a value less than that for the period between the times $t_0$ and $t_1$ and the period after the time $t_2$ shown in FIG. 7(*a*). Detection using the sonar is validated for the entire period. In this case, since the influence of the noise of the inverter 2 is small, it is possible to perform measurement using the sonars 1*a* to 1*d* with high accuracy. In addition, it is possible to increase the carrier frequency of the inverter 2 in the range in which the carrier frequency does not affect the sonars 1*a* to 1*d*. Therefore, the control accuracy of the motor 32, which is an electric motor, is improved and response or fuel efficiency is improved.

In the above-described embodiment, the ultrasonic sonar is used as the detector. However, the detector may be various kinds of detecting devices which are likely to interfere with the noise of the inverter 2. For example, a sensor using electromagnetic waves may be used as the detector.

The above-described embodiment is applied to the split hybrid vehicle, but the invention is not limited thereto. The invention can be applied to other types of hybrid vehicles or electric vehicles using only a motor as a driving source.

INDUSTRIAL APPLICABILITY

The invention is suitable for various types of hybrid vehicles and electric vehicles.

REFERENCE SIGNS LIST

1, 1*a* to 1*d*: ULTRASONIC SONAR
2: INVERTER
4: ENGINE
5: SONAR ECU
6: FREQUENCY DETERMINING DEVICE
7: BRAKE ECU
8: HV-ECU
9: ENG-ECU
10: MG-ECU
11: SONAR SW
12: CAN
13: HYDRAULIC BRAKE
31,32: MOTOR

The invention claimed is:

1. A vehicle having an obstacle detection device, comprising:
   an AC motor;
   an inverter that drives the motor;
   a detector that detects an obstacle around a vehicle using an electromagnetic wave or a sound wave;
   a determining device for determining whether noise generated from the inverter is likely to interfere with a detection frequency of the detector; and
   a controller or intermittently operating the detector when the determining device determines that the noise is likely to interfere with the detection frequency and changing the carrier frequency of the inverter only when the detector is operated.

2. The vehicle having the obstacle detection device according to claim 1, wherein the detector is an ultrasonic sonar.

3. The vehicle having the obstacle detection device according to claim 1, wherein
   the motor can perform regenerative braking when the vehicle is braked; and
   the controller prohibits the regenerative braking and permits only hydraulic braking when the detector detects the obstacle.

4. A vehicle having an obstacle detection device, comprising:
   an AC motor, wherein the motor can perform regenerative braking when the vehicle is braked;
   an inverter that drives the motor;
   a detector that detects an obstacle around a vehicle using an electromagnetic wave or a sound wave;
   a determining device for determining whether noise generated from the inverter is likely to interfere with a detection frequency of the detector; and
   a controller for changing the carrier frequency of the inverter when the determining device determines that the noise is likely to interfere with the detection frequency, and prohibiting the regenerative braking and permitting only hydraulic braking when the detector detects the obstacle.

* * * * *